United States Patent
Busch

(10) Patent No.: US 8,608,835 B2
(45) Date of Patent: Dec. 17, 2013

(54) EXHAUST GAS PURIFICATION SYSTEM FOR AN INTERNAL COMBUSTION ENGINE

(75) Inventor: Michael-Rainer Busch, Ebersbach (DE)

(73) Assignee: Daimler AG, Stuttgart (DE)

( * ) Notice: Subject to any disclaimer, the term of this patent is extended or adjusted under 35 U.S.C. 154(b) by 1004 days.

(21) Appl. No.: 12/445,220

(22) PCT Filed: Sep. 18, 2007

(86) PCT No.: PCT/EP2007/008108
§ 371 (c)(1),
(2), (4) Date: Jan. 19, 2010

(87) PCT Pub. No.: WO2008/043422
PCT Pub. Date: Apr. 17, 2008

(65) Prior Publication Data
US 2010/0132558 A1    Jun. 3, 2010

(30) Foreign Application Priority Data

Oct. 11, 2006   (DE) .................. 10 2006 048 045

(51) Int. Cl.
| | | |
|---|---|---|
| *B01D 46/00* | (2006.01) | |
| *B01D 50/00* | (2006.01) | |
| *B01D 24/00* | (2006.01) | |
| *B01D 39/14* | (2006.01) | |
| *B01D 39/06* | (2006.01) | |

(52) U.S. Cl.
USPC ............... 95/287; 55/522; 55/523; 55/524; 422/169; 422/170; 422/171; 422/172; 422/177; 422/178; 422/179; 422/180; 422/181; 422/182

(58) Field of Classification Search
USPC ............ 55/522–524; 422/169–172, 177–182; 95/287
See application file for complete search history.

(56) References Cited

U.S. PATENT DOCUMENTS

| 4,704,863 | A | * | 11/1987 | Abthoff et al. .................. 60/311 |
|---|---|---|---|---|
| RE33,118 | E | * | 11/1989 | Scheitlin et al. ................ 60/299 |
| 4,900,517 | A | * | 2/1990 | Domesle et al. .............. 422/171 |
| 5,822,977 | A | * | 10/1998 | Fukuda et al. .................. 60/274 |
| 6,516,611 | B1 | | 2/2003 | Schaefer-Sindlinger et al. |

(Continued)

FOREIGN PATENT DOCUMENTS

| DE | 199 23 781 A1 | 12/2000 |
|---|---|---|
| EP | 1 515 018 A1 | 3/2005 |
| JP | 2006226808 | * 8/2006 |

OTHER PUBLICATIONS

Hayashi et al., English Translation of Measuring Device for Particulate Amount, Measuring Method of Particulate Amount, and Exhaust Emission Control Device, Aug. 2006, Japan.*

(Continued)

*Primary Examiner* — Amber Orlando
(74) *Attorney, Agent, or Firm* — Crowell & Moring LLP

(57) ABSTRACT

An exhaust gas purification system for an internal combustion engine of a motor vehicle is provided. The system includes a first particulate filter element and a second particulate filter element, which is connected downstream of the first particulate filter element and through which flows the exhaust gas that emanates from the first particulate filter element. The first particulate filter element operates as a system filter and the second particulate filter element operates as a diagnostic filter. A charge of the diagnostic filter can be determined, and the functional capability of the system filter can be deduced based thereon.

13 Claims, 2 Drawing Sheets

(56) References Cited

U.S. PATENT DOCUMENTS

Figure 1:
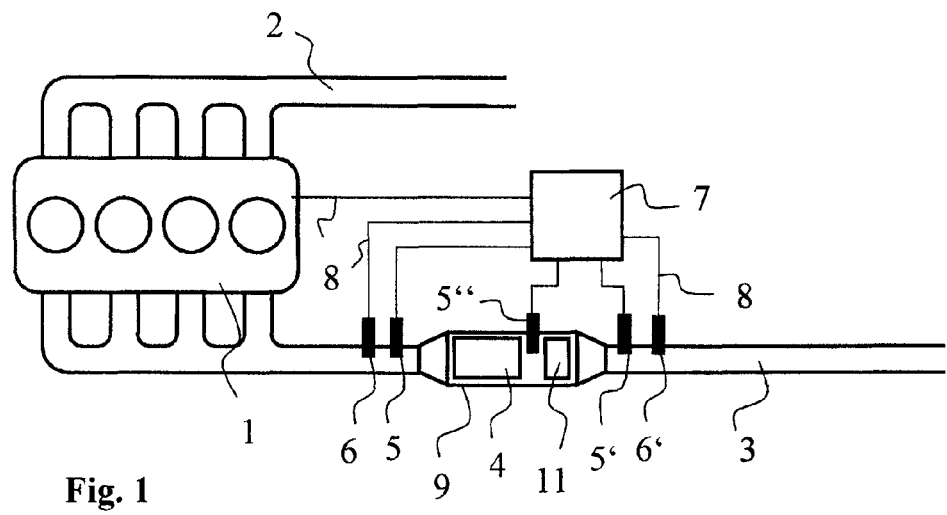

| | | | |
|---|---|---|---|
| 6,808,688 B1 * | 10/2004 | Saito et al. | 422/177 |
| 6,892,529 B2 * | 5/2005 | Duvinage et al. | 60/286 |
| 7,338,642 B2 * | 3/2008 | Nakatani et al. | 422/180 |
| 7,347,042 B2 * | 3/2008 | Bruck et al. | 60/297 |
| 7,862,640 B2 * | 1/2011 | Zhang et al. | 55/523 |
| 8,057,746 B2 * | 11/2011 | Matsuoka | 422/171 |
| 2003/0213231 A1 * | 11/2003 | Tabata | 60/280 |
| 2004/0161373 A1 * | 8/2004 | Ichikawa et al. | 422/180 |
| 2005/0008548 A1 * | 1/2005 | Nakatani et al. | 422/180 |
| 2006/0021335 A1 * | 2/2006 | Opris | 60/297 |
| 2006/0039843 A1 * | 2/2006 | Patchett et al. | 423/239.1 |
| 2006/0196167 A1 * | 9/2006 | Odajima et al. | 60/277 |

OTHER PUBLICATIONS

International Search Report (Form PCT/ISA/210) dated Nov. 30, 2007 with partial English translation (Four (4) pages).

Written Opinion of the International Searching Authority (Form PCT/ISA/237) with partial English translation (Seven (7) pages).

* cited by examiner

EXHAUST GAS PURIFICATION SYSTEM FOR AN INTERNAL COMBUSTION ENGINE

CROSS REFERENCE TO RELATED APPLICATIONS

This application is a national stage of PCT International Application No. PCT/EP2007/008108, filed Sep. 18, 2007, which claims priority under 35 U.S.C. §119 to German Patent Application No. 10 2006 048 045.7, filed Oct. 11, 2006, the entire disclosures of which are herein expressly incorporated by reference.

BACKGROUND AND SUMMARY OF THE INVENTION

The invention relates to an exhaust gas purification system for an internal combustion engine of a motor vehicle.

DE 199 23 781 A1 discloses an exhaust gas purification system comprising a first particulate filter element and a second particulate filter element connected downstream thereof. The second particulate filter element thereby has a reduced transmission of soot particles compared to the first particulate filter element. Either an oxidation catalyst for oxidation of nitrogen monoxide (NO) to nitrogen dioxide ($NO_2$) is assigned to the particulate filter elements, or they are respectively provided with a catalytic oxidation coating effective in that respect. Due to this embodiment, every particulate filter element is provided with sufficient $NO_2$ for the low temperature oxidation of deposited soot.

Exemplary embodiments of the present invention provide an exhaust gas purification system for exhaust gas of internal combustion engines, the effectiveness of which for removing particles can be monitored in a reliable manner.

According to exemplary embodiments of the invention, charge sensor are provided for the exhaust gas purification system of the internal combustion machine mainly operated with air excess, which provide a magnitude correlating with a particle charge of the second particulate filter element. An evaluation unit assigned to the exhaust gas purification system is further provided, which evaluates the magnitude provided by the charge sensor in relation to a deposit effect of the first particulate filter element.

The first particulate filter element can have a high particle deposit degree of typically more than 99%, so that the exhaust gas has a very low particle content downstream of the intact first particulate filter element. During a malfunction of the first particulate filter element, for example due to a defect by crack formation, its filtering effect reduces and the exhaust gas flowing from the first particulate filter element contains added particles, but which are filtered by the second particulate filter element connected downstream. The second particulate filter element is thereby increasingly charged with particles, which can be sensed with the charge sensor provided according to the invention by providing a magnitude correlating with the particle charge of the second particulate filter element. The deposit effect of the first particulate filter element can be determined or estimated by the evaluation of the provided magnitude and a functional check or monitoring of the first particulate filter element can thereby take place. If, for example, a slow increase or a low extent of the particle charge of the second particulate filter element is determined by the charge sensor, the first particulate filter element is found to be functioning correctly. But if the charge increase of the second particulate filter element is faster than given by a defined comparison value, or if the particle charge of the second particulate filter element exceeds a given threshold, this is seen as a malfunction of the first particulate filter element and a corresponding message can displayed. The threshold can be preset, for example depending on a total operating time or an operating time since the last successful thermal regeneration of the first or the second particulate filter element.

In accordance with exemplary embodiments of the invention, the second particulate filter element is arranged in the exhaust gas purification system in such a manner that the heat amount transferred during a thermal regeneration of the first particulate filter element to the second particulate filter element is sufficient to heat the second particulate filter element to a temperature necessary for combusting deposited soot. A thermal regeneration in this context is a regeneration due to an oxygen-induced soot combustion. Depending on the soot composition, this takes place at temperatures of about 600° C., wherein a reduction to 500° C. can be achieved by employing catalytically acting additives or coatings.

A heat transfer from the first particulate filter element to the second particulate filter element thereby mainly takes place in a convective manner through the exhaust gas, which has been heated on its way to the first particulate filter element and/or through the first particulate filter element or which initially already has a high temperature. Additional heating taking place during a thermal regeneration of the first particulate filter element due to a heat release during the soot combustion can thereby also be used. The exhaust gas entering the second particulate filter element can thereby heat the second particulate filter element to or above a soot combustion temperature, so that it is regenerated by oxygen-induced soot combustion. For achieving a preferably aspired good heat transfer, it is thereby advantageous if the second particulate filter element is arranged near or immediately behind the first particulate filter element. An arrangement in the same housing can be employed. In this manner, a heat transfer by radiation can take place in addition to a convective heat transfer.

Due to the embodiment according to the invention, the second particulate filter element can compensate the loss of the filter effect especially with a fractionally deteriorated first particulate filter element with regard to the deposit degree. A high particle reduction is nevertheless achieved thereby, even with damaged first particulate filter element to a certain extent.

In a further aspect of the present invention, the particle capacity of the first particulate filter element is a multiple of the particle capacity of the second particulate filter element. The reduced particle capacity of the second particulate filter element compared to the first particulate filter element can be realized by designing it small compared to the first particulate filter element. The second particulate filter element can have less than about 50%, especially less than 30% of the volume of the first particulate filter element with an otherwise same design. With a comparatively low reduction of the deposit degree of the first particulate filter element, the load of the second particulate filter element is still relatively low, so that its purification effect for an altogether low particle emission is sufficient, especially as soot particles deposited in the second particulate filter element are combusted from time to time or depending on demand in connection with a thermal regeneration of the first particulate filter element. The second particulate filter element is also regenerated with this regeneration, and can again filter particles. A lower particle capacity of the second particulate filter element can however also be achieved by a lower porosity. The particulate filter elements are, however, designed the same in this respect, where a particulate filter with a flow-through wall can be employed. A surface filter, for example in the form of a sinter metal filter or depth filter, for example in the form of ceramic foam can alternatively be employed.

In accordance with another aspect of the present invention, the first and the second particulate filter elements are designed in such a manner that a reception of a defined particle amount at the second particulate filter element causes a significantly increased rise of the flow resistance compared to the first particulate filter element. Due to this design, a particularly sensitive functional monitoring of the first particulate filter element is enabled, as a small particle charge of for example 1 g/l or less already causes a significant increase of the flow resistance, whereas a particle charge of the same size with the first particulate filter element effects a low or negligible increase of the flow resistance. As a result, a malfunction or a reduced deposit degree of the first particulate filter element can be determined quickly by the charge sensor. In a further design of the invention, the charge sensor comprise back pressure sensor or flow resistance sensor. This forms a particularly robust and simultaneously economic embodiment for sensing the filter charge. A differential pressure sensor can be employed, whereby a reliable determination of a back pressure or flow resistance correlated with the charge is enabled.

In accordance with a further aspect of the present invention, the charge sensor comprise back pressure sensor or flow resistance sensor. As, with soot combustion during a thermal regeneration, a heat amount correlated with the amount of the deposited or combusted soot is released, a temperature increase of the exhaust gas or of the particulate filter element effected thereby can be evaluated with regard to the deposited or combusted soot amount. If the temperature increase exceeds a given value, this indicates an increased particle load of the second particulate filter element and thus a faulty first particulate filter element.

BRIEF DESCRIPTION OF THE DRAWING FIGURES

Figure 2:
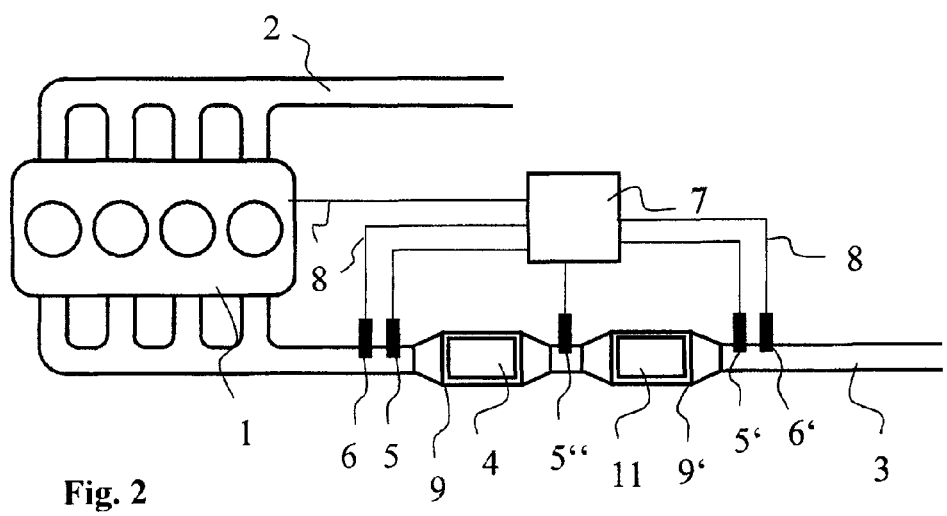
Figure 3:
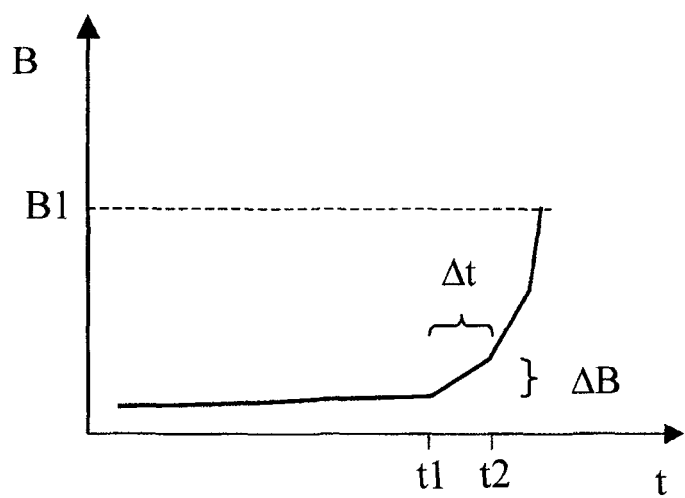

Advantageous embodiments of the invention are illustrated in the drawings and are described in the following. The previously mentioned characteristics, which are to be explained in the following, cannot only be used in the respective given characteristics combinations, but also in other combinations or can be used on their own without leaving the scope of the present invention. It shows thereby:

FIG. 1 a schematic block diagram of an internal combustion engine with a first advantageous embodiment of the exhaust gas purification system according to the invention, FIG. 2 a schematic block diagram of an internal combustion engine with a second advantageous embodiment of the exhaust gas purification system according to the invention, and FIG. 3 a time diagram with a schematically shown exemplary progression for a particle charge of a particulate filter element.

DETAILED DESCRIPTION OF THE INVENTION

In FIG. 1 is shown an internal combustion engine 1 of a motor vehicle preferably formed as a diesel engine, which obtains its combustion air via an intake air line 2, and whose exhaust gases are fed to a first particulate filter element 4 arranged in a housing 9 via an exhaust gas line 3 for filtering out particulate components. The exhaust gases cleaned by particles are discharged to the environment by an end exhaust silence 10, not shown, arranged downstream.

Downstream of the first particulate filter element 4 is arranged a second particulate filter element 11 in the exhaust gas line 3, which, analogously to the first particulate filter element 4, can also filter particulate components from the exhaust gas. While the first particulate filter element 4 can be employed to bring about the bulk of the filter effect, the second particulate filter element 11 mainly serves for monitoring or for the functional capability of the first particulate filter element 4 arranged upstream. The first particulate filter element 4 is subsequently called system filter, and the second particulate filter element 11 diagnostic filter. The function of the diagnostic filter 11 and the cooperation of the system filter 4 and diagnostic filter 11 is explained in more detail in the following.

In the advantageous version shown in FIG. 1, the diagnostic filter 11 is arranged together with the system filter 4 in the housing 9 for both filters 4, 11.

An exhaust gas sensor system for sensing essential exhaust gas condition magnitudes such as pressure, temperature, oxygen content and possibly other magnitudes is provided for the exhaust gas purification system of the internal combustion engine 1. In the example shown in FIG. 1, a first pressure sensor 5 and a first temperature sensor 6 are arranged on the inlet side of the system filter 4, and a second pressure sensor 5' and a second temperature sensor 6' in the exhaust gas line 3 on the outlet side of the diagnostic filter 11. A third pressure sensor 5" is arranged in the housing 9 in such a manner between the system filter 4 and the diagnostic filter 11, that it can sense the pressure which is present between these two particulate filter elements 4, 11. Further, a differential pressure effective over the respective particulate filter element 4 or 11 can be sensed by the pressure sensors 5, 5" or 5" and 5'. Further sensor and exhaust gas purification components as for example lambda sensors, temperature sensors guided into the interior of the system filter 4 or the diagnostic filter 11, catalytic exhaust gas purification components arranged in front of and behind the particulate filter elements 4, 11 can also be provided, but are not shown for sake of clarity. An oxidation catalyst for the oxidation of hydrocarbons, carbon monoxide or nitrogen monoxide can be provided upstream of the system filter 4. The oxidation catalyst can thereby serve for exhaust gas temperature increase with a thermal particle filter regeneration by afterburning the combustible components fed by the exhaust gas or can provide $NO_2$ by oxidation of NO for a low temperature regeneration. A nitrogen oxide purification catalyst arranged downstream of the diagnostic filter 11 is also advantageous.

An electronic control device 7 is provided for controlling the operation of the internal combustion engine 1 and the exhaust gas purification system. The control device 7 contains information about significant condition magnitudes of the internal combustion engine 1 and the exhaust gas purification system as e.g. speed, temperatures, pressures of corresponding sensors or probes, and can issue control signals as setting magnitudes at actuators as e.g. an AGR valve or an exhaust gas turbocharger (not shown) on the other hand. The control device 7 is further capable of adjusting an injection of fuel in line with demand. The control device 7 can access stored engine characteristics or calculation routines for this. For carrying out these functions, the control device 7 is connected to the respective components via data lines 8, wherein the data lines 8 can be present in the form of unidirectional or bidirectional signal or control lines.

During a normal operation of the internal combustion engine 1, a purification of the exhaust gases takes place by filtering out soot particles preferably mainly through the system filter 4. The system filter 4 preferably has a large deposit degree of over 95%, in particular of over 99%, and particularly preferred of more than 99.5% in relation to the particle mass. The system filter 4 can be designed in such a manner that the particle content of the exhaust gas can be reduced to less than 10 mg, particularly preferred to less than 5 mg, and especially to less than 2 mg per km of driven distance or per kWh of engine work. The system filter 4 can be designed as a particle filter with flow-through wall in honeycomb structure with channels alternatively closed at the ends, so that exhaust gas flowing into the system filter 4 is forced through the channel walls. The system filter is preferably constructed of SiC, cordierite, or aluminum titanate. A design as a sinter metal filter or as depth filter, for example in the form or a metal or ceramic foam are however also possible. Designs as electrostatic particle precipitator or cyclonic precipitator are also possible.

Due to the filtering out of particles which are mainly present as soot, a slowly increasing soot charge of the system filter 4 generally occurs, so that this clogs in an increasing measure, and its flow resistance increases. So as to again decrease the exhaust gas counter pressure caused thereby, particulate filter regenerations are necessary from time to time by thermal, oxygen-induced soot combustion. The temporal intervals where these thermal regenerations become necessary, thereby significantly depend on the particle charge of the exhaust gas and on the particle capacity of the system filter 4. A particle filter regeneration by thermal soot combustion during a soot charge of the system filter 4 is typically initiated with a soot charge of the system filter 4 of several grams soot, related to a liter of particulate filter volume. A determination of the corresponding time can take place by the control device 7 based on the model. An evaluation of the signals of the first and/or third pressure sensor 5, 5" is provided alternatively or additionally. When a limit charge or a limit value for the back pressure caused by the particle charge is achieved, a thermal regeneration is initiated. For this, the temperature of the exhaust gas or of the system filter 4 is, for example, increased by motoric measures in such a manner that the soot collected in the system filter 4 can combust. Temperatures of over 600° C. are typically reached in the system filter 4. Due to the heat release during the soot combustion, temperatures of more than 800° C. can occur locally, which stresses the system filter thermally in a corresponding strong manner.

Although a fuel addition could be provided for decreasing the soot combustion temperature, and/or a catalytic coating for the system filter 4, this can result in damage to the system filter 4, particularly with the thermal regeneration, which can for example express itself by crack formation or fusings. As a result thereof, the filter effect or the deposit degree of the system filter 4 can be reduced more or less intensely. Such a malfunction of the functional capability of the system filter 4 can be recognized by the diagnostic filter 11 provided according to the invention, and an increased discharge of particles to the environment can additionally be avoided.

The diagnostic filter 11 is arranged downstream of the system filter 4 and receives exhaust gas flowing from the system filter 4. The particle content of the filtered exhaust gas is highly reduced with a fully functional system filter 4. The diagnostic filter 11 is only charged marginally with particles in this case, and is thus only charged slowly with particles. However, with a system filter 4, whose deposit degree is reduced, a faster charging of the diagnostic filter 11 takes place. As the particle charge of the diagnostic filter 11 can for example be determined by the evaluation of the back pressure sensed by the third pressure sensor 5" or by determining the flow resistance by the evaluation of the signals delivered by the pressure sensors 5, 5", a monitoring of the functional capability of the system filter 4 is enabled. Due to the filter effect of the diagnostic filter 11, an excessive emission of particles to the environment is additionally also avoided with a faulty system filter 4.

The diagnostic filter 11 can adapt to the filter effect of the system filter 4. The diagnostic filter 11 can be executed in such a manner that, with a fully functional system filter 4 according to a given limit running path of the vehicle, its flow resistance, determined with a mean load point of the internal combustion engine 1, falls below a given limit value. The diagnostic filter 11 is designed such that the exhaust gas counter pressure of the diagnostic filter 11 falls below a limit value of 200 mbar, especially preferred of 100 mbar, with a fully functional particulate filter 4 after a limit running path of about 10,000 km.

As the diagnostic filter 11 is only charged minimally with particles when the system filter 4 is intact, it can be formed correspondingly small. The diagnostic filter 11 can have a mounting volume which falls below 50% of the system filter 4. The mounting volume of the diagnostic filter 11 is less than 30% of the system filter 4 in an exemplary embodiment. The particle capacity of the diagnostic filter 11 is thereby typically only a fraction of the particle capacity of the system filter 4. That is, with a defined charge amount, the diagnostic filter 11 experiences a considerably higher increase of the flow resistance than the system filter 4. The detection sensitivity of the diagnostic filter 11 with regard to filtered out particles due to a faulty system filter 4 is improved in this manner. Allowances are also made for the fact that the diagnostic filter 11 does only have to filter out larger particle amounts during a filter failure of the system filter 4.

The design of the diagnostic filter 11 can also be chosen according to a given minimum filter action with a faulty or ineffective system filter 4. It can be provided that the diagnostic filter 11 can also reduce the particle content of the exhaust gas below 100 mg per km of driven distance or per kWh engine work with a system filter 4 deteriorated by 50% for example. A reduction of less than 25 mg, particularly less than 5 mg, is preferably enabled per km of driven distance or per kWh engine work. A low particle emission of the corresponding vehicle is thereby also ensured with a faulty or failed particulate filter 4.

For a sensitive detection in relation to particles which are passed through by the system filter 4, the diagnostic filter 11 can also have a reduced porosity compared to the system filter 4. The reception of a certain particle amount thus causes a significant increase of the flow resistance with the diagnostic filter 11 compared to the system filter 4.

In order to ensure a functional monitoring of the system filter 4 over a long period of time, the diagnostic filter 11 can be arranged in the exhaust gas line 3 in such a manner that it is also heated to a temperature above the soot combustion temperature during a thermal regeneration of the system filter 4 due to heat transfer. The diagnostic filter 11 is thus heated sufficiently with a regeneration of the system filter 4 without referring to additional heating measures, so as to be regenerated automatically during the regeneration process for the system filter 4 and to be freed from deposited soot. The diagnostic filter 11 can thereby additionally adjust the loss of the effect of the system filter 4 over a longer period of time with a damaged system filter 4. The diagnostic filter 11 can optionally be mainly designed for such a redundancy effect or with emphasis for a diagnostic effect. In the first case, a diagnostic filter 11 designed approximately as large as the system filter 4 with a similarly high particle capacity is advantageous. If a sensitive diagnostics of the system filter 4 is paramount, a smaller design or a lower particle capacity is advantageous.

To ensure that the diagnostic filter 11 is also regenerated automatically during a forcibly induced thermal regeneration by oxygen-induced soot combustion of the system filter 4, the diagnostic filter 11 can be arranged comparatively close behind the system filter 4. With the embodiment shown in FIG. 1, this is ensured by arrangement in the housing common for both particulate filter elements 4, 11. The distance in the exhaust gas flow direction is preferably a few centimeters, so that sensors projecting into the gap can be accommodated. The diagnostic filter 11 can possibly also be arranged bundled or almost with contact behind the system filter 4 while foregoing these sensors. A particularly good heat transfer by convection and/or radiation from the system filter 4 to the diagnostic filter 11 is enabled in this manner while renouncing undesired heat losses.

The heat amount transferred from the system filter 4 to the diagnostic filter 11 during its regeneration can also suffice for an automatic regeneration of the diagnostic filter, if the diagnostic filter 11 is arranged in a separate housing, but close enough behind the housing of the system filter 4. In FIG. 2, such an arrangement is shown schematically. Components having the same functions compared to FIG. 1 are thereby provided with the same reference numerals. The arrangement of the diagnostic filter 11 in a separate housing 9' can have particular advantages regarding the available mounting ratios, but also manufacturing advantages and advantages regarding maintenance. A further advantage is the possibility of a more reliable determination of the heat released during a regeneration in the diagnostic filter 11 due to the soot combustion or a temperature increase resulting therefrom. This can be sensed by an arrangement of temperature sensors on the inlet and outlet side of the diagnostic filter 11, not shown separately, and can be evaluated with regard to the combusted soot amount. With the chosen arrangement of the diagnostic filter according to FIG. 2, the temperature measurement is influenced less by the thermal relations present in the immediate environment of the system filter.

With the sensing of the heat amount released by a regeneration in the diagnostic filter 11 by one or more suitably applied temperature sensors, a soot amount accumulated since the last previous successful thermal regeneration can be calculated by the control device 7. The result can again be put in relation to a deposit degree and thus the functional capability of the system filter 4. By sensing the heat released during a regeneration of the diagnostic filter 11, the functional capability of the system filter 4 can thus be evaluated. As only small amounts of soot are accumulated in the diagnostic filter 11 in the normal case with an intact system filter 4, the heat release or the temperature increase is often very small or negligible during its combustion. A temperature load of the diagnostic filter 11 resulting therefrom is consequently also often low, in particular with an arrangement in a separate housing. It can therefore be provided to design the diagnostic filter 11 of a less temperature-fast and thus more economical material, for example cordierite. In contrast, it is advantageous to choose a high temperature-fast material such as SiC for the system filter 4.

As explained, a monitoring of the functional capability of the system filter 4 takes place by sensing the particle charge of the diagnostic filter 11 according to the invention. This can for example take place by an electric sensor which generates a signal correlating with the particle charge. For sensing the particle charge of the diagnostic filter 11, the signal of the third pressure sensor 5" and/or of the second pressure sensor 5' is preferably evaluated by the control device 7. It is advantageous in this connection to evaluate the signals which are present with given motor operating points. An evaluation of the sensor signals in relation to a period of time since the last successfully running thermal regeneration is particularly advantageous. A continual or virtually continual evaluation can also be provided, where the flow resistance of the diagnostic filter 11 correlated with the particle charge is determined while considering the exhaust gas mass flow and the exhaust gas temperature known to the control device 7. A determination from other magnitudes can however also be provided, which are influenced by the particle charge 11 of the diagnostic filter 11. The signal of a lambda probe or a pressure value sensed in an exhaust gas return can for example be consulted for this.

In the following, an advantageous approach with the functional monitoring of the system filter 4 is explained with a time diagram shown in FIG. 3. In the diagram of FIG. 3, an exemplary progression of the determined particle charge B of the diagnostic filter 11 is shown in dependence on the time t. The absolute value of the sensed particle charge B and/or its temporal increase DB/Dt is evaluated for assessing the functional capability of the system filter 4. As can be seen from the curve progression, the particle charge B only increases with a small measure up to time t1, and also has low values. The function of the system filter 4 is evaluated as correct in this case. From the time t1 results a higher temporal increase DB/Dt of the particle charge B, which can be ascribed to a reduced deposit degree of the system filter 4. The determined increase DB/Dt is compared to a given limit value, and when the limit value is exceeded, an error message is displayed with regard to a malfunction of the system filter 4. An error message can be displayed additionally or alternatively, if the absolute value of the particle charge B reaches or exceeds a threshold B1. An analog approach can of course also be provided for the magnitude correlating with the particle charge B of the diagnostic filter 11. It is particularly advantageous to evaluate a temperature increase determined during a regeneration via the diagnostic filter 11 in an analog manner. The determined temperature increases are thereby preferably compared to a given threshold.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An exhaust gas purification system for an internal combustion engine of a motor vehicle, comprising:
    a first particulate filter element;
    a second particulate filter element connected downstream of the first particulate filter element and through which flows exhaust gas emanating from the first particulate filter element, wherein the second particulate filter has a lower porosity compared to the first particulate filter;
    a charge sensor that provides a magnitude correlating with a particle charge of the second particulate filter element; and
    an evaluation unit that evaluates the magnitude provided by the charge sensor in relation to a deposit effect of the first particulate filter element,
    wherein the first particulate filter element is structurally configured with a removal rate of more than 95% with respect to particulate mass.

2. The exhaust gas purification system according to claim 1, wherein the second particulate filter element is connected downstream of the first particulate filter element so that the second particulate filter element receives all of the exhaust gas emanating from the first particulate filter element.

3. The exhaust gas purification system according to claim 2, wherein the second particulate filter element is arranged in the exhaust gas purification system in such a manner that a heat transfer from the first particulate filter element to the second particulate filter element can take place, where the heat amount transferred during a thermal regeneration of the first particulate filter element to the second particulate filter element is sufficient to heat the second particulate filter element to a temperature necessary for combusting deposited soot.

4. The exhaust gas purification system according to claim 2, wherein the charge sensor comprises a back pressure sensor or flow resistance sensor.

5. The exhaust gas purification system according to claim 2, wherein the charge sensor comprises a temperature sensor.

6. The exhaust gas purification system according to claim 2, wherein the first particulate filter element is configured such that particulate content of exhaust gas passing through the first particulate filter element is reduced to less than 5 mg per km traveling distance or per kWh of engine work.

7. The exhaust gas purification system according to claim 2, wherein the second particulate filter element is configured such that exhaust gas backpressure of the second particulate filter element falls below a limit value of 200 mbar at a medium load point of the internal combustion engine after a limit traveling distance of approximately 10,000 km with a fully functional first particulate filter element.

8. The exhaust gas purification system according to claim 2, wherein the second particulate filter element is configured such that particulate content of exhaust gas passing through the second particulate filter element is reduced to less than 5 mg per km traveling distance or per kWh of engine work when a filtering effect of the first particulate filter element is reduced by 50%.

9. The exhaust gas purification system according to claim 2, wherein the first particulate filter element includes a catalytic coating.

10. The exhaust gas purification system according to claim 2, further comprising:
an oxidizing catalyst arranged upstream of the first particulate filter element.

11. The exhaust gas purification system according to claim 10, further comprising:
a nitrogen oxide purification catalyst arranged downstream of the second particulate filter element.

12. An exhaust gas purification system for an internal combustion engine of a motor vehicle, comprising:
a first particulate filter element;
a second particulate filter element connected downstream of the first particulate filter element and through which flows exhaust gas emanating from the first particulate filter element;
a charge sensor that provides a magnitude correlating with a particle charge of the second particulate filter element; and
an evaluation unit that evaluates the magnitude provided by the charge sensor in relation to a deposit effect of the first particulate filter element,
wherein the second particulate filter element is connected downstream of the first particulate filter element so that the second particulate filter element receives all of the exhaust gas emanating from the first particulate filter element,
wherein a particle capacity of the second particulate filter element is a fraction that is less than one of a particle capacity of the first particulate filter element,
wherein the first and second particulate filter elements are structurally configured with different volumes such that a charging with a certain particle amount in the second particulate filter element causes an increased rise of the flow resistance compared to a flow resistance caused by a charging of the first particulate filter element with the certain particle amount.

13. An exhaust gas purification system for an internal combustion engine of a motor vehicle, comprising:
a first particulate filter element;
a second particulate filter element connected downstream of the first particulate filter element and through which flows exhaust gas emanating from the first particulate filter element;
a charge sensor that provides a magnitude correlating with a particle charge of the second particulate filter element; and
an evaluation unit that evaluates the magnitude provided by the charge sensor in relation to a deposit effect of the first particulate filter element,
wherein the second particulate filter element is connected downstream of the first particulate filter element so that the second particulate filter element receives all of the exhaust gas emanating from the first particulate filter element,
wherein the first and second particulate filter elements are structurally configured with different volumes such that a charging with a certain particle amount in the second particulate filter element causes an increased rise of the flow resistance compared to a flow resistance caused by a charging of the first particulate filter element with the certain particle amount.

* * * * *